United States Patent [19]

Greenhalgh et al.

[11] E Re. 29,724

[45] Reissued Aug. 8, 1978

[54] DYEING PROCESS

[75] Inventors: Colin William Greenhalgh; David Francis Newton; Dennis Eckersley; Ian Cheetham; Duncan Adrian Sidney Phillips; Kenneth Dunkerley; Gerald Williams; Vibhas Chokshi, all of Manchester, England

[73] Assignee: Imperial Chemical Industries Limited, London, England

[21] Appl. No.: 775,516

[22] Filed: Mar. 8, 1977

Related U.S. Patent Documents

Reissue of:

[64] Patent No.: 3,953,162
Issued: Apr. 27, 1976
Appl. No.: 453,632
Filed: Mar. 21, 1974

[30] Foreign Application Priority Data

Apr. 25, 1973 [GB] United Kingdom ..... 19580/73
Oct. 16, 1973 [GB] United Kingdom ..... 48080/73

[51] Int. Cl.[2] ..... D06P 1/20; C09B 1/00

[52] U.S. Cl. ..... 8/39 B; 8/1 A; 8/1 E; 8/1 XA; 8/41 B; 8/42 B; 8/85 R; 8/163; 8/174; 8/178 R

[58] Field of Search ..... 8/39 B, 41 B, 174, 178 R, 8/1 E, 85 R

[56] References Cited

U.S. PATENT DOCUMENTS

| | | | |
|---|---|---|---|
| 3,163,635 | 12/1964 | Riat et al. | 260/153 |
| 3,453,255 | 7/1969 | Doss | 260/153 |
| 3,485,572 | 12/1969 | Taube et al. | 8/42 |
| 3,624,068 | 11/1971 | Derinert | 260/199 |

FOREIGN PATENT DOCUMENTS 1,087,673 10/1967 United Kingdom.

*Primary Examiner*—A. Lionel Clingman
*Attorney, Agent, or Firm*—Cushman, Darby & Cushman

[57] ABSTRACT

Dyeing nylon by applying sulphonated or unsulphonated dyestuffs containing cyclic anhydride groups, anhydride forming dicarboxylic acid groups or half-esters or half-amides thereof, as free acids or as salts with ammonia or volatile amines, and heating the fibre until dyestuff fixation takes place.

10 Claims, No Drawings

DYEING PROCESS

Matter enclosed in heavy brackets [ ] appears in the original patent but forms no part of this reissue specification; matter printed in italics indicates the additions made by reissue.

This invention relates to a dyeing process for polyamide fibres, for example polyhexamethylene adipamide (nylon 66) and polycaprolactam (nylon 6). All polyamide fibres are hereinafter called "nylon".

This invention provides a process for dyeing nylon fibres by applying thereto a dyestuff containing a dicarboxylic cyclic anhydride grouping or a dicarboxylic acid grouping such that cyclic anhydride formation can occur by loss of water therefrom, or a half-ester or half-amide of such a dicarboxylic acid grouping, any carboxylic acid group in the said dyestuff being present in free acid form or in the form of a salt with ammonia or a volatile amine, and heating the nylon fibre until fixation of the dyestuff takes place.

The term half-amide includes half-amides derived from ammonia as from amines of the formula —NH-R'R" wherein R' is hydrogen or an alkyl, substituted alkyl or aryl group and R" is an alkyl or substituted alkyl group.

Thus the grouping which must be present in the dyestuffs to be used in the invention is graphically represented as one of the following alternatives

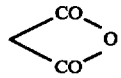

cyclic anhydride

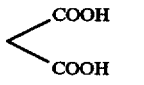

dicarboxylic acid

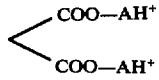

dicarboxylic acid salt

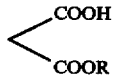

half-ester

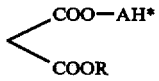

half-ester salt

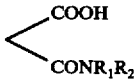

half-amide

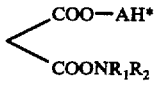

half-amide salt wherein A represents a molecule of ammonia or a volatile amine particularly an aliphatic or cycloaliphatic amine e.g. methylamine, ethylamine, cyclohexylamine, diethylamine or triethylamine, $R_1$ is hydrogen or an alkyl or substituted alkyl group (e.g. of 1 to 5 carbon atoms) or an aryl group and $R_2$ is hydrogen or an alkyl or substituted alkyl group (e.g of 1 to 5 carbon atoms).

Optionally the dyestuffs may also contain at least one sulphonic acid group or salt thereof.

It will be understood that the two CO groups in each of the above representations must be in such relative positions that anhydride formation is present or is possible. For example the CO groups may be a. In adjacent positions on a carbocyclic aromatic ring, e.g. in ortho positions on a benzene ring.

b. In anhydride forming positions on an alkyl chain e.g. the 1:3 or preferably the 1:2-positions.

c. Positioned one on a carbocyclic aromatic ring and one in anhydride forming position on a side chain, as for example in homophthalic acid.

It will be understood that more than one of the above groupings may be present and that when such is the case the groupings need not be identical.

Depending upon their solubilities the dyestuffs may be applied to nylon fibre either from solutions or as dispersions.

Thus water-soluble salts (for example salts with ammonia, volatile amines or alkali metals) of the dicarboxylic acids, half-esters or half-amides may be dissolved to form solution dyebaths or padding liquors. When an alkali metal salt is used, then either before or after application to nylon fibre free carboxylic acid may be liberated by means of mineral or organic acid or a substance which generates an acid or heating, for example ammonium thiocyanate. When a salt with ammonia or a volatile amine is used, then it is not necessary to liberate the free acid.

Alternatively the dyestuffs in free acid or anhydride form may be applied to nylon in the form of fine dispersions in aqueous or organic liquids or mixtures thereof or in the form of solutions in organic liquids.

The dyestuffs may also be applied to the nylon fibre as print pastes containing conventional thickening agents e.g. locust bean gum ethers, sodium alginate, gum tragacanth, starch ethers and esters or mixtures of these with stable oil-in-water emulsions.

Print pastes or application liquors may also contain known additives, such as dispersing agents, electrolytes, wetting agents, solubilizing assistants, mild oxidizing agents, urea or other additives of a type which assist dye fixation.

The heating step of the process is carried out until fixation of the dyestuff on the nylon fibre takes place, by which is meant that at least some of the dyestuff becomes more firmly associated with the fibre through chemical and/or physical interaction, and is therefore more difficult to remove than it is before the heating treatment.

More particularly the dyestuffs may be applied to nylon fibre from an aqueous oe non-aqueous liquor or by printing techniques and subsequently baked or steamed, desirably at temperatures above 125° C and preferably at 180° to 210° C.

After carrying out the process of the invention it may be advantageous to treat the nylon fibre with a dilute alkali, for example 0.05N sodium carbonate in order to remove loose dyestuff from the fibre. Alternatively loose dyestuff may be removed by means of a solvent for the dyestuff.

It is probable that the dyestuffs are fixed to the nylon fibre to some extent by chemical reaction with the fibre, possibly amide links, since the dyestuffs are only partially removed from the fibre by treatment with solvents for the dyes such as boiling pyridine, aqueous pyridine, dimethyl formamide, acetic acid or chlorobenzene. In this respect the dyestuffs appear to behave in a similar way to known reactive dyestuffs, such as those containing chlorotriazine groupings.

However the types of reactive dyestuffs known prior to the filing of our UK Application No. 19580/73 all require the presence of alkali in order that the reaction with the fibre may take place. In the process of the present invention and that of U.K. Application No. 19580/73 alkali is not required.

It is a further advantage of the invention that the dyestuffs used do not undergo irreversible hydrolysis to unreactive compounds either during storage or during the process itself. It is believed that in the process of the invention the nylon fibre reacts with anhydride dyestuffs which may be produced thermally from the grouping present in the original dyestuff.

We now exemplify some of the types of dyestuff which are to be used in the process of the invention. In this exemplification, for brevity, reference is chiefly made to dicarboxylic acid groupings. It will be understood that in the present invention there may be used the same dyestuffs wherein the dicarboxylic acid groupings are replaced by any of the groupings represented graphically as above.

AZO DYESTUFFS

In azo dyestuffs suitable for use in the process of the invention the dicarboxylic acid grouping may be on the residue of a diazo component (A), a coupling (or end) component (E), a middle component (M) meaning a component which can be coupled with a diazotized azo component and subsequently diazotized for further coupling, or a component (Z) which couples with two (identical or different) diazotized azo component molecules.

Thus, adopting conventional representations of azo dyestuffs, using an arrow to indicate "diazotized and coupled with", dyestuff suitable for use in the process of the invention are for example,

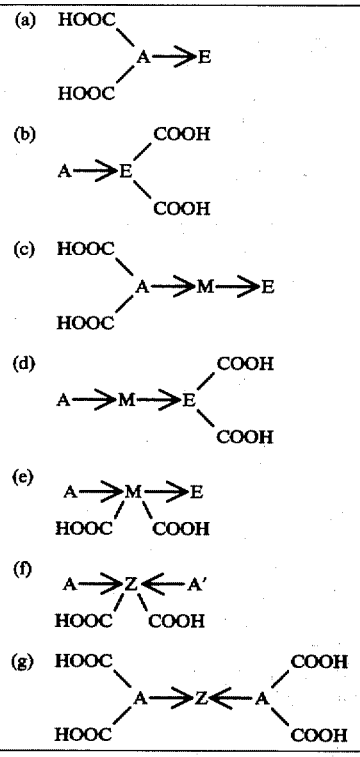

Diazo Components (A) may be, for example of the formulae:

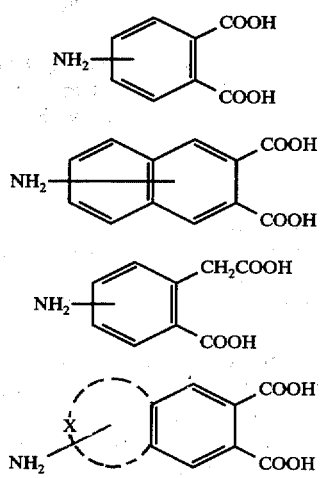

wherein X represents the atoms necessary to complete a (substituted or unsubstituted) heterocyclic aromatic ring.

Specific examples of such diazo components are:

3 and 4-aminophthalic acids,
aminohomphthalic acid,
3-amino-4-cyano-5-methylphthalic acid,
2-amino-5,6-dicarboxybenzthiazole.

The following half esters of 4-aminophthalic acid: methyl, ethyl, n-propyl, iso-propyl, n-butyl, β-hydroxyethyl, β-methoxyethyl, β-ethoxyethyl, cyclohexyl and phenyl.

The half amide of 4-aminophthalic acid and the following N-substituted derivatives of the half amide of 4-aminophthalic acid: methyl, n-butyl, iso-propyl, cyclohexyl, phenyl, tolyl, p-chlorophenyl, diethyl, di-β-hydroxyethyl, methyl phenyl.

Diazo components A may also be of the formula:

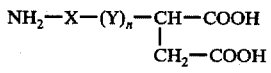

wherein X represents an arylene residue, n is 0 or 1, and Y is a linking atom or group, for example of the formula —O—, —S—, —$SO_2$—, —CO—, —$CH_2$—, —CONH—, —NHCO—, —NHCO$(CH_2)_m$Z— (m being an integer from 1 to 6 and Z is a direct link, —S—, —$SO_2$—, —NH—, —N acyl— or —N alkyl—), —NH—, —N(COalkyl)—, —N(COaryl)—, —$SO_2$NH—, —NH$SO_2$—, —$CH_2$NH—, —$CH_2$N(COalkyl)— or —$CH_2$N(COaryl)—.

Specific examples of such diazo components are:

4-aminophenylsuccinic acid
4-aminophenylthiosuccinic acid
3- and 4-aminobenzenesulphonylsuccinic acid
4-aminophenoxysuccinic acid
3-aminobenzoylsuccinic acid
3- and 4-aminobenzoylaminosuccinic acid
4-aminophenylaminocarbonylsuccinic acid
4-aminoanilinosuccinic acid
N-acetyl(4-aminophenyl)aminosuccinic acid
3-aminobenzenesulphonylaminosuccinic acid
4-aminophenylaminosulphonylsuccinic acid
4-aminobenzylaminosuccinic acid N-benzoyl(4-aminobenzyl)aminosuccinic acid
4-aminobenzylsuccinic acid
3- and 4-aminophenylaminoacetylthiosuccinic acid
3- and 4-aminophenylaminoacetylsuccinic acid The following half esters of 4-aminophenyl succinic acid: methyl, ethyl, n-butyl, β-hydroxyethyl, β-ethoxyethyl, cyclohexyl, phenyl. The half amides of 4-aminophenylsuccinic acid and the following N-substituted derivatives of the half amide of 4-aminophenyl succinic acid: methyl, n-butyl, iso-propyl, cyclohexyl, phenyl, tolyl, p-chlorophenyl, methyl phenyl.

Diazo components (A) may also be of the formula:

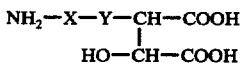

wherein X represents an arylene residue, Y represents a linking atom or group of the formula —O—, —S—, —$SO_2$—, —NH—, Nacyl—, Nalkyl—.

Specific examples of such diazo components are:

α-(4-aminophenoxy)β-hydroxysuccinic acid
α-(4-aminobenzyloxy)β-hydroxysuccinic acid
α-(4-aminoanilino)β-hydroxysuccinic acid
α-(4-aminophenylthio)-β-hydroxysuccinic acid
α-(4-aminophenylsulphonyl)-β-hydoxysuccinic acid.

Diazo components (A) may also be of the formula:

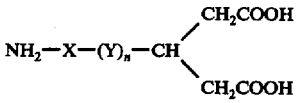

wherein X represents an arylene residue, n is 0 or 1, Y represents a linking atom or group of the formula —O—, —S—, —$SO_2$—, —NH—, —NHCO—, —NH—, —N(COalkyl)—, —N(COaryl)—, $SO_2$NH—, —$NHSO_2$—, —$CH_2$NH—, —$CH_2$NR—, —$CH_2$N-(COalkyl)—, —$CH_2$N(COaryl)—, —CONH—.

Specific examples of such diazo components are:

2-(3-aminophenyl)glutaric acid
2-(3-amino-4-methoxyphenyl)glutaric acid
2-(4-aminophenyl)glutaric acid
2-(4-aminophenoxy)glutaric acid
2-(4-aminophenylamino)glutaric acid
2-[N-(4-aminophenyl)acetylamino]glutaric acid
2-(4-aminophenylthio)glutaric acid
2-(4-aminobenzyl)glutaric acid
2-(3-aminobenzenesulphonylamino)glutaric acid.

Coupling Components (E)

1. May be for example of the formula:

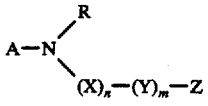

wherein A represents aryl radical, having for example as substituents —NHCOalkyl, —NHCOaryl, —Oalkyl, alkyl, R represents hydrogen or an alkyl or substituted alkyl radical, X represents an alkylene or substituted alkylene radical, n is 0 or 1, m is 1 or is 0 if n is 0, Y represents —O—, —S—, —SO—, —NH—, —N(alkyl)—, —CONH—, —NHCO—, and Z represents a grouping of the formula:

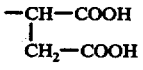

or

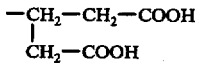

or

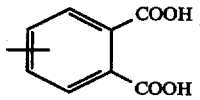

or

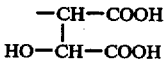

Specific examples of such coupling components are:

N-ethyl-N-[β-(α,β-dicarboxyethylthio)ethyl]aniline
N-ethyl-N-[β-(α,β-dicarboxyethylthio)ethyl]3-toluidine
N-ethyl-N-[β-(α,β-dicarboxyethylthio)ethyl]3-acetylamino aniline
N-ethyl-N-[β-(α,β-dicarboxyethylsulphonyl)ethyl]aniline
N-[β-(α,β-dicarboxyethylaminocarbonyl)ethyl]aniline
anilinosuccinic acid
o-anisidinosuccinic acid
m-toluidinosuccinic acid
m-acetylaminoanilinosuccinic acid
α-(N-methylanilino)β-hydroxysuccinic acid
N-β-cyanoethyl-N-[β-(α,β-dicarboxyethylthio)ethyl]aniline
N-ethyl-N-[β-(3,4-dicarboxybenzoylamino)ethyl]aniline
N-[β-(α,γ-dicarboxy-n-propylaminocarbonyl)ethyl]aniline.

2. Further coupling components are the acyl derivatives obtained by reacting an amine of the formula:

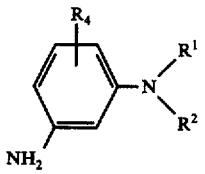

(wherein $R_1$ and $R_2$ are alkyl or substituted alkyl groups and $R_1$ nay additionally represent hydrogen, and $R_4$ is hydrogen, alkyl or alkoxy) with a compound of the formula:

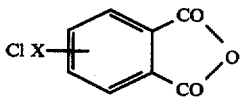

-continued

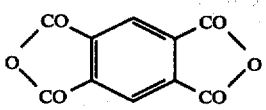

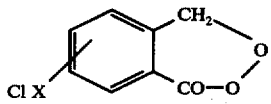

where X = CO, $SO_2$, $CH_2$,

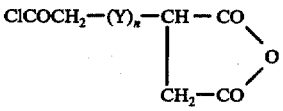

where Y - S, $CH_2$; n = 0, 1. or

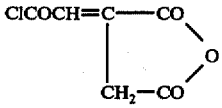

3. known coupling components containing hydroxyl or amino groups, e.g. pyrazolones, pyrimidines, indoles, 6-hydroxypyridones, acylacetamides, naphthols and naphthylamine derivatives may be converted into coupling agents of the required type by acylation with appropriate dicarboxylic acid derivatives. Thus

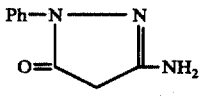

may be reacted with

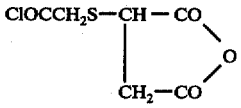

and

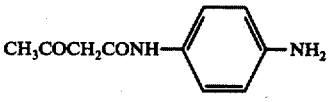

may be reacted with

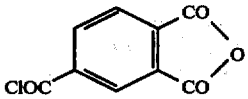

Alternatively coupling components which contain a reactive acyl or halogen group may be reacted with one of the compounds listed above as diazo components or with the amines indicated below.

Thus

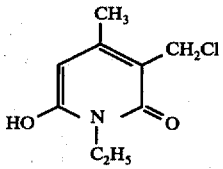

may be reacted with

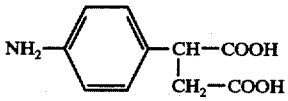

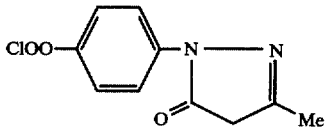

may be reacted with

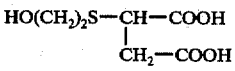

and 2,4-bis diethylamino-6-chloropyrimidine may be reacted with thiosuccinic acid.

Specific examples of heterocyclic coupling components are:

2-methyl-5,6-dicarboxyindole
1-phenyl-2-methylindolyl-5-thiosuccinic acid
1-(3,4-dicarboxyphenyl)-3-methyl-5-pyrazolone.

ALTERNATIVE MANUFACTURE OF AZO DYESTUFFS

Dyestuffs suitable for use in the invention may also be made from known types of azo dyes by condensation with a compound containing a dicarboxylic acid grouping.

Thus for example azo dyestuffs containing hydroxyl, amino or alkylamino groups may be condensed with an acylating agent containing a dicarboxylic acid grouping, for example with epoxy succinic anhydride or one of the acylating agents indicated in the above sub-paragraph (2) under the heading "Coupling Components".

Alternatively azo dyestuffs containing carboxyl halide groups or "mixed anhydride" groups in which a pendant carboxylic acid group in in anhydride formation with a simple acid such as acetic or benzoic acid, may be condensed with the amines listed above as Diazo components (A) or with intermediates such as:

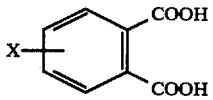

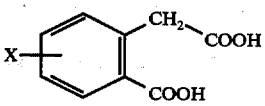

where X represents OH, $NH_2$, NH alkyl,

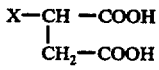

where X represents HO, HS, $NH_2$, NH alkyl

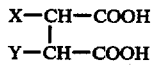

X represents S-alkyl, S-aryl, NH alkyl, NH aryl, NH acyl; Y represents HO

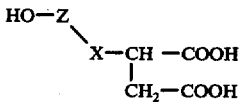

X represents S, O, $SO_2$, $SO_2NH$, CONH Z represents alkylene, aryl, aralkyl.

ANTHRAQUINONE DYESTUFFS

Anthraquinone dyestuffs suitable for use in the invention are generally obtainable by condensation of known anthraquinone compounds with compounds containing a dicarboxylic acid grouping.

Thus for example anthraquinone compounds containing hydroxyl or amino radicals in pendant groups may be acylated by means of the acylating agents indicated in the above sub-paragraph (2) under the heading "Coupling components". Examples of such anthraquinone compounds are 1-amino-4-hydroxy-2-(4-hydroxyphenoxy)anthraquinone
1-hydroxy-4-(4-aminophenylamino)anthraquinone
1-amino-4-(phenylamino)-2-hydroxymethyl anthraquinone The same acylating agents may be used to acylate anthraquinones containing nuclear amino groups, for example all such anthraquinones as are listed in UK Specification No. 1,087,673 from line 5 on page 8 to the first formula on page 12.

Alternatively anthraquinones containing reactive acyl groups may be condensed with the amines listed as diazo components (A) listed above, or with the amino or hydroxyl compounds indicated as intermediates in the above passage headed "Alternative manufacture of azo dyestuffs".

Thus for example 1-amino-4-phenylaminoanthraquinone-2-carboxylchloride may be condensed with 4-aminophthalic acid.

As a further alternative anthraquinones containing reactive halogen atoms or hydroxyl groups may be condensed with nucleophilic compounds containing a dicarboxylic acid grouping, for example with the diazo components (A) listed above or the amino or hydroxyl compounds indicated as intermediates in the above paragraph on "Alternative manufacture of azo dyestuffs".

Thus for example the following compounds may be condensed:

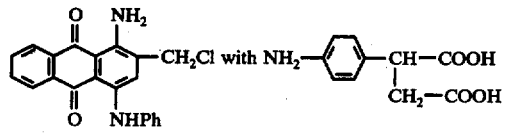

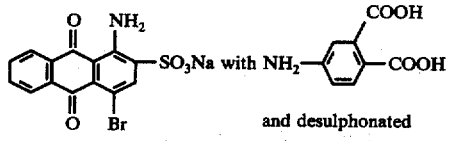

and desulphonated

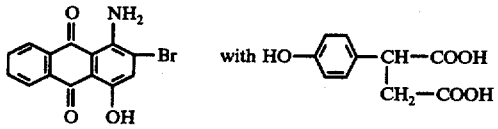

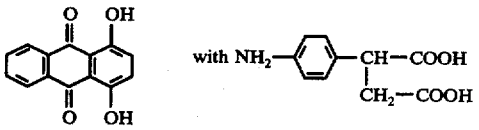

OTHER DYESTUFFS

Other dyestuffs which come into consideration for use in the process of the invention include phthalocyanines, triphendioxazines and triarylmethanes. There may also be used Quinphthalone dyes, these being of the general formula:

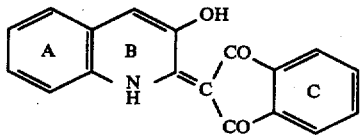

wherein rings A, B and C may carry substituents, and the dicarboxylic acid grouping may be located at any of these rings.

Specific examples are:

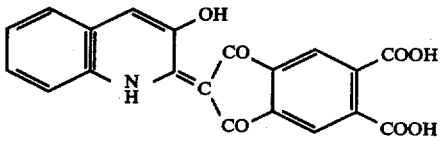

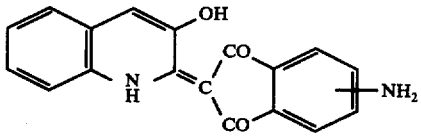

condensed with the acylating agents indicated above under Azo dyes Coupling Components sub-paragraphs (2) and (3).

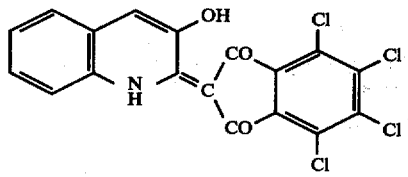

reacted with the nucleophilic reagents indicated above under the heading "Anthraquinone Dyes" so that one Cl is replaced.

Methine and Nitromethine dyes

For example

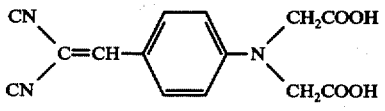

DYESTUFFS CONTAINING SULPHONATE GROUPS

Typical nylon acid dyes can be used containing additionally a dicarboxylic acid grouping (or a half-ester, half-amide or anhydride thereof). Additional reactive groups may also be present in such dyestuffs.

Dyes for nylon which contain one or more sulphonate groups may be obtained in the following ways:

AZO DYESTUFFS of the types previously described may be substituted in the A, E, M or Z components by sulphonic acid groups. The following components may be used to make such dyes:

Diazo Components 4-amino-2- and 3-sulphophenylsuccinic acid
4-amino-2- and 3-sulphophenylthiosuccinic acid
3-amino-5-sulphobenzenesulphonylsuccinic acid
4-amino-5-sulphobenzenesulphonylsuccinic acid
3-amino-5-sulphobenzenesulphonylglutaric acid
4-amino-3-sulphophenoxysuccinic acid
3-amino-4-sulphobenzylaminosuccinic acid
4-(4-amino-3-sulphophenylaminosulphonyl)phenylsuccinic acid
4-(4-amino-3-sulphophenylsulphonylamino)phenylsuccinic acid
4-(4-amino-3-sulphophenylaminocarbonyl)phthalic acid
1-(3,4-dicarboxybenzoylamino)-2-aminonaphthalene-4,8-disulphonic acid
2-amino-5-(3,4-dicarboxyphenylaminosulphonyl)-naphthalene-1-sulphonic acid
2-amino-5-(4-α,β-dicarboxyethylphenylaminosulphonyl)naphthalene-1-sulphonic acid
2-amino-8-(4-α,β-dicarboxyethylthiophenylaminosulphonyl)naphthalene-4-sulphonic acid
3-amino-5-sulphohomophthalic acid.

Coupling Components 1. p-Coupling amines of the benzene series to which are attached dicarboxylic acid groupings and which contain 1 or more sulphonate groups, e.g.

4(3-aminophenylcarbonylamino)-2-sulphophenylsuccinic acid
4(3-amino-5-sulphophenylaminocarbonyl)phthalic acid
3-amino-5-sulphophenylsuccinic acid.

2. Naphthols and aminonaphthols which have a dicarboxylic acid grouping directly or indirectly attached and which contain one or more sulphonate groups, e.g.

2-hydroxy-3(4-α,β-dicarboxyethylphenylaminocarbonyl)-naphthalene-5- or 6- or 7-sulphonic acid
2-hydroxy-3(4-α,γ-dicarboxy-n-propylphenylaminocarbonyl)-naphthalene-5- or 6- or 7-sulphonic acid
1-hydroxy-6-(3,4-dicarboxybenzoylamino)-naphthalene-3-sulphonic acid
1-hydroxy-6-(4-α,β-dicarboxyethylphenylsulphonylamino)-naphthalene-3-sulphonic acid
1-hydroxy-8-(3,4-dicarboxyphenylsulphonylamino)-naphthalene-3,6-disulphonic acid
1-hydroxy-7-(3,4-dicarboxyphenylsulphonylamino)-naphthalene-3,6-disulphonic acid 3. Heterocyclic coupling components of the pyrazolone series which may contain a dicarboxylic acid grouping and one or more sulphonate groups, e.g.

1-(3-amino-4-sulphophenyl)-3-(3,4-dicarboxyphenylaminocarbonyl)-5-pyrazolone
1-(3-sulpho-4-aminophenyl)-3-(3,4-dicarboxyphenylaminocarbonyl)-5-pyrazolone
1-(3-sulpho-4-aminophenyl)-3-(3,4-dicarboxybenzoylamino)-5-pyrazolone Azo dyestuffs containing sulphonic acid groups may also be obtained by diazotization of an azo component which carries a dicarboxylic acid grouping but is unsulphonated, and coupling with a sulphonated coupling component. In this way the following dyestuffs may be obtained:

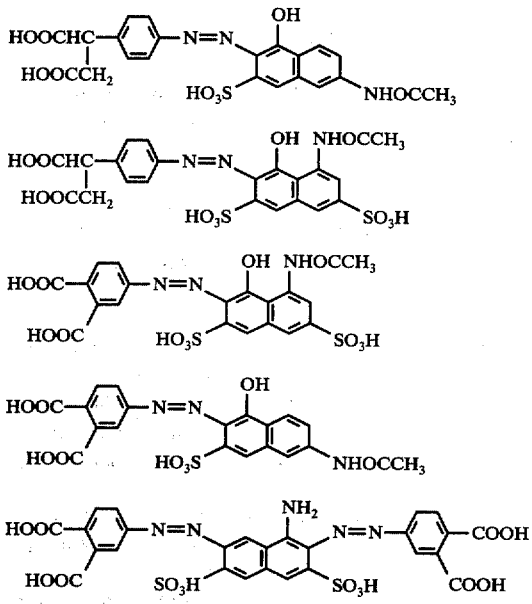

ANTHRAQUINONE DYESTUFFS which contain a dicarboxylic acid grouping together with sulphonic acid groups may be obtained by the following methods:

1. Condensation of halogenoanthraquinone sulphonic acid with an amino compound which carries a dicarboxylic acid grouping, e.g. condensation of 4-bromo-1-aminoanthraquinone-2-sulphonic acid with α-(4-aminophenyl)succinic acid.

2. Condensation of 1,4-dihydroxyanthraquinone sulphonic acid with an amino compound which carries a dicarboxylic acid grouping, e.g. condensation of 1,4-dihydroxyanthraquinone-5-sulphonic acid with α-(4-aminophenyl)succinic acid.
3. Condensation of a nuclearly sulphonated anthraquinone having a sulphonyl chloride group in a pendant phenyl ring with an amino compound carrying a dicarboxylic acid grouping e.g. condensation of 1-amino-4(3-chlorsulphonylphenylamino)anthraquinone-2-sulphonate with 4-aminophthalic acid, α-(4-aminophenyl)succinic acid or α-(4-aminophenyl)glutaric acid.

PHTHALOCYANINE DYESTUFFS containing sulphonate groups and dicarboxylic acid groupings may be prepared by condensing a copper phthalocyanine sulphonyl chloride with less than its stoichiometric equivalent of an amino compound carrying a dicarboxylic acid grouping e.g. [CuPC = copper phthalocyanine]

CuPc $(SO_2Cl)_4$ + 2 mole 4-aminophenyl succinic acid

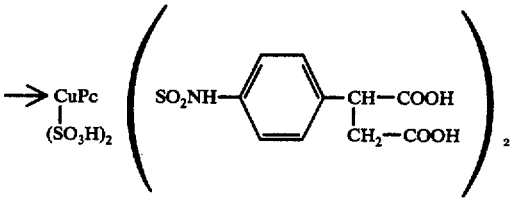

NITRODIPHENYLAMINE DYESTUFFS containing sulphonate groups and dicarboxylic acid groupings may be prepared by condensing a nitrohalogenobenzene with an aminobenzene compound carrying a dicarboxylic acid grouping, at least one of the two reactants carrying also a sulphonate group. In this way the following useful dyestuffs may be made

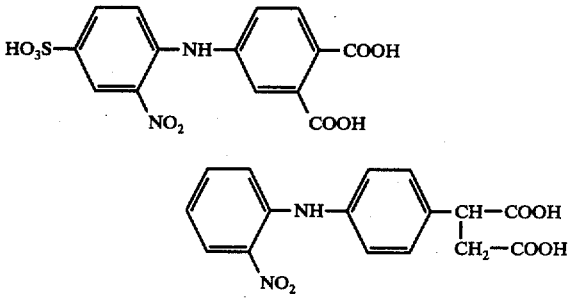

As previously indicated, sulphonated dyestuffs used in the invention may additionally contain another type of fibre-reactive grouping, for example a halogenotriazinyl grouping. Examples of such dyestuffs are as follows The triangle represents a triazine ring:

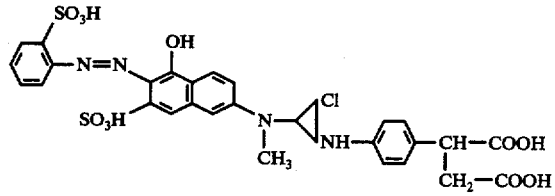

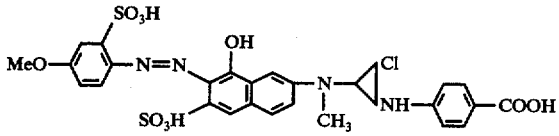

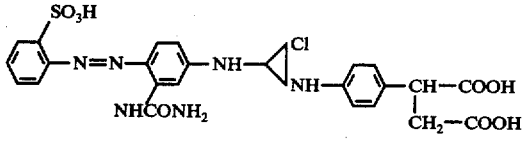

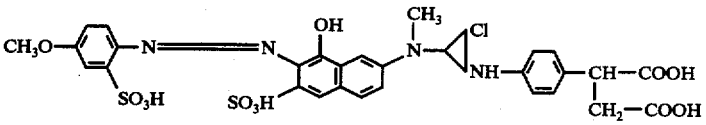

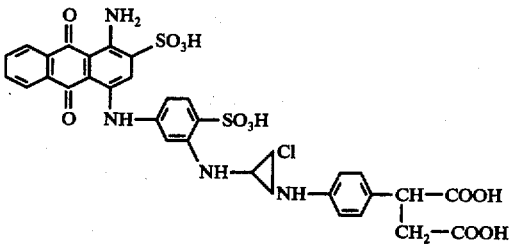

-continued

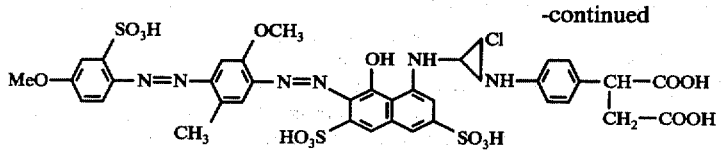

The cobalt and chromium complexes of

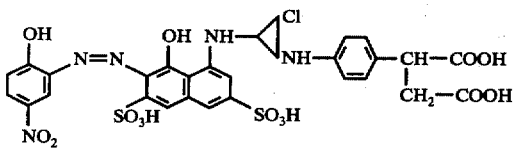

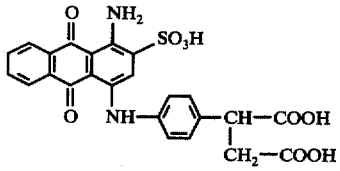

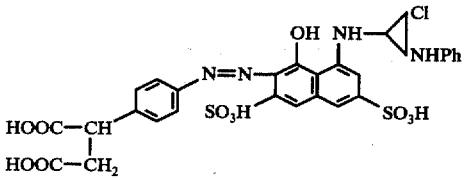

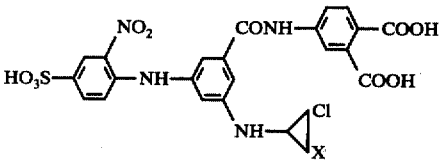

where X represents —NHR, —OR, —SR where R represents alkyl, substituted alkyl, aryl(including sulphoaryl).

The invention is illustrated but not limited by the following Examples in which all parts and percentages are by weight.

Example 1

The dyestuff 1-phenyl-3-methyl-4(3,4-dicarboxyphenylazo)-5-pyrazolone (Dyestuff 1) is milled to a 10% aqueous dispersion in the presence of a dispersing agent based on a naphthalene-2-sulphonic acid, formaldehyde condensate, 20 parts of this dispersion is mixed with 2 parts of sulphonated methyl oleate and 78 parts of water and the mixture used to impregnate a texturized knitted nylon 66 fabric. The fabric is then squeezed between rollers to give an impregnation of 80 parts of pad liquor to 100 parts of fabric, and the fabric dried in air. Portions of the fabric are then heated at 180° C for 8 minutes in superheated steam, and at 200° C for 1 minute in hot air respectively. The fabrics are rinsed in cold water, treated at the boil in a bath containing 0.2% sodium carbonate and 0.3% sodium dodecylbenzene sulphonate for 10 minutes, then rinsed and dried. Yellow dyeings of very good color yield and good fastness properties are obtained.

Example 2

In place of the dyestuff used in Example 1 there is used the dyestuff N,N-diethyl-4(3-carboxy-4-carbomenthoxyphenylazo) aniline (Dyestuff 2) a reddish orange dyeing is obtained which shows good fastness to washing. The dyestuff is not removed to any significant extent from the fabric by boiling with aqueous pyridine.

When the dyestuff is applied to a nylon textile material from an aqueous dispersion at 100° C a bright orange dyeing is obtained from which substantially all color is removed on boiling with aqueous pyridine. However when this dyeing is aftertreated by heating at 200° C for 2 minutes the shade becomes redder and only a small amount of dye is removed by boiling with aqueous pyridine. Furthermore the dyeing now shows excellent wash fastness.

It is concluded that when Dyestuff 2 is applied to nylon by the high temperature conditions indicated then the dyestuff reacts with the fibre to a significant extent.

Example 3

A milled dispersion of the dyestuff comprising the anhydride of N,N-diethyl-4(3,4-dicarboxyphenylazo)aniline (Dyestuff 3) is padded onto woven nylon textile material which is dried and then baked at 190° C for 2 minutes. Surface dye is removed by warming to 70° C in a bath contaning 0.2% sodium carbonate and 0.2% of a synthetic organic detergent. A bright orange red shade is obtained which shows good wash fastness properties. The dyestuff is not removed by boiling with aqueous pyridine.

When the above dispersion is applied to the nylon fabric from an aqueous bath at 100° C for ½ hour a yellow dyeing of the dyestuff N,N-diethyl-4(3,4-dicaboxyphenylazo)aniline is obtained showing that hydrolysis of the anhydride occurs under these aqueous dyeing conditions. When this dyeing is boiled with aqueous pyridine the dyestuff is substantially removed showing that under these aqueous dyeing conditions no reaction with the fibre takes place. If the fabric from the aqueous dyeing is heated at 200° C for 2 minutes the shade changes to orange red and the dyestuff is no longer extracted by boiling aqueous pyridine indicating that reaction with the fibre has occurred probably by the intermediate formation of the dyestuff anhydride (Dyestuff 3) induced by the thermal treatment.

In Examples 4–50 (Table I) reference is made to Application Methods A to D which are now described.

Application Method A

A piece of woven nylon textile material is impregnated with an aqueous solution of the sodium salt of the dyestuff and the material dried. The fabric is then passed through a bath of dilute sulphuric acid, then washed free of mineral acid and dried. The material is then heated in high temperature steam at 180° C for 8 minutes or baked at 200° C for 2 minutes and loose dye removed from the treated fabric by immersion in a bath of 0.2N sodium carbonate for 10 minutes at 80° C. After rinsing free of alkali the dyed fabric is dried at 70° C. The dyed fabric so obtained shows excellent fastness to washing.

Application Method B

A piece of woven nylon textile material is impregnated with a milled aqueous dispersion or an aqueous solution or an aqueous acetone solution of the dyestuff and the material dried at 70° C. The material is then heated at 180° C for 8 minutes in superheated steam or baked at 200° C for 2 minutes and loose surface dye removed from the treated fabric by heating in 0.2% sodium carbonate solution containing 0.2% of a synthetic organic detergent for 5–10 minutes at 70° C. The dyeing so obtained shows good wash fastness properties.

Application Method C

A print paste is prepared according to the following recipe:

| | | |
|---|---|---|
| Dyestuff as 10% aqueous dispersion or as an aqueous or aqueous acetone solution | 18.6 | g. |
| Water | 7.1 | ml |
| Ammonia solution S.G. 0.880 | 0.5 | ml |
| Indaica PA3 thickening 9% solution (Locust bean gun ether) | 50 | g |
| Water to | 100 | g |

The paste is applied by printing to a nylon fabric. After drying the prints are fixed by a treatment in superheated steam at 180° C for 8 minutes or in hot air for 2 minutes at 200° C. The prints are then rinsed in cold water, treated for 10 minutes at 80° C in a solution containing 2 g/l soda ash and 3 g/l sodium dodecyl benzene sulphonate, rinsed again in cold water and dried.

Prints are obtained showing good level of fixation. The prints have good wash fastness properties. In place of the ammonia used in the above recipe an equivalent amount of methylamine, diethylamine, cyclohexylamine or triethylamine may be used.

Similar results may be obtained when the print paste additionally contains 12.0 parts of urea, 8.5 parts of polyethylene glycol (350) and 3.3 parts of ammonium thiocyanate.

Application Method D

A print paste is prepared as described in Application Method C with the omission of ammonia or any other amine. The paste is applied by printing to a woven nylon fabric. After drying the prints are fixed by treatment at 180° C for 8 minutes in high temperature steam or in hot air at 200° C for 2 minutes. The prints are then rinsed in cold water, treated for 10 minutes at 80° C in a solution containing 2 g/l soda ash and 3 g/l sodium dodecyl benzene sulphonate, rinsed again in cold water and dried.

Prints are obtained which show a good level of fixation and which have good wash fastness properties.

The polyethylene glycol used in the above recipe may be omitted or replaced by an equal amount of caprolactam, diethylene glycol, dimethyl ether, thiodiglycol or butyrolactone.

| Example | Dyestuff No. | DYESTUFF | Application Method | Shade on Nylon |
|---|---|---|---|---|
| 4 | 1 | 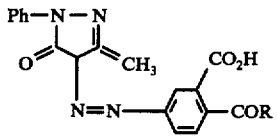 R = OH | A<br>C with ammonia<br>D | Yellow |
| 5 | 4 | As Example 4 R=$O(CH_2)_2OCH_3$ | A<br>B<br>C with triethylamine<br>D | Yellow |
| 6 | 5 | As Example 4 R = $-N$ ($CH_3$, Ph) | B | Yellow |
| 7 | 6 | As Example 4 R = $N(C_2H_5)_2$ | B | Yellow |
| 8 | 7 | 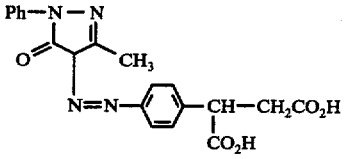 | B<br>D | Yellow |
| 9 | 8 | 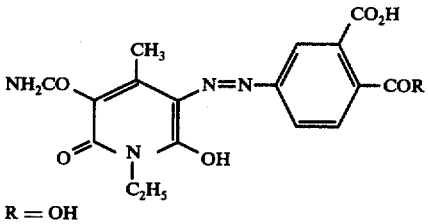 R = OH | B<br>C with ammonia<br>D | Greenish-yellow |
| 10 | 9 | As Example 9 R = OH | B | Greenish-yellow |
| 11 | 10 | As Example 9 R = $OC_2H_5$ | B | Greenish-yellow |
| 12 | 11 | As Example 9 R = $NHCH_3$ | B | Greenish-yellow |
| 13 | 12 | As Example 9 R = $N(C_2H_5)_2$ | B | Greenish-yellow |

-continued
| Example | Dyestuff No. | DYESTUFF | Application Method | Shade on Nylon |
|---|---|---|---|---|
| 14 | 13 | 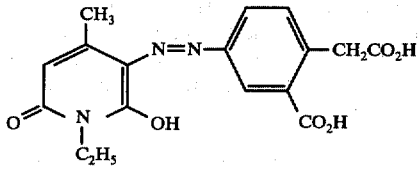 | A<br>B | Greenish-yellow |
| 15 | 14 | 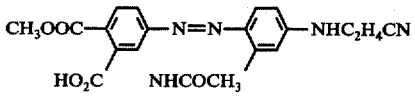 | D | Orange |
| 16 | 15 | 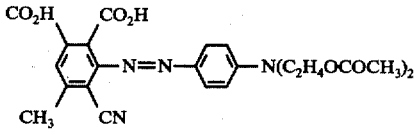 | D | Orange |
| 17 | 16 | 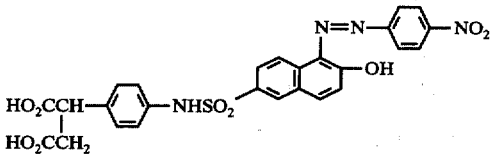 | B | Scarlet |
| 18 | 17 | 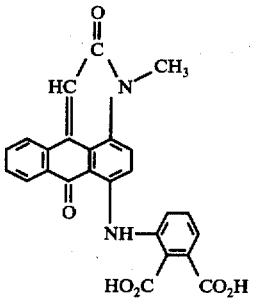 | B<br>D | Bluish-red |
| 19 | 18 | 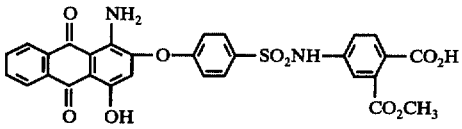 | B | Red |
| 20 | 19 | 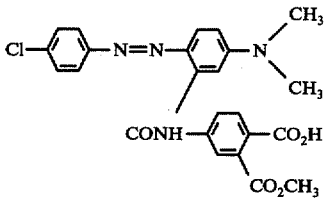 | A<br>D | Red |
| 21 | 20 | 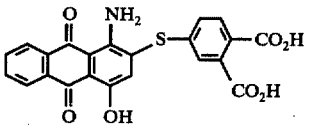 | B<br>C with methylamine | Rubine |
| 22 | 21 | 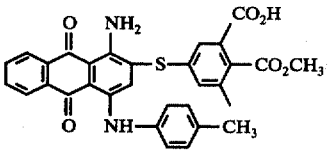 | D | Greenish-blue |
| 23 | 22 | 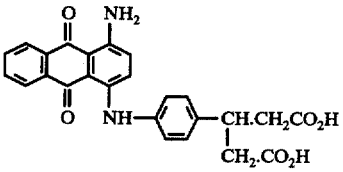 | B | Blue |

-continued

| Example | Dyestuff No. | DYESTUFF | Application Method | Shade on Nylon |
|---|---|---|---|---|
| 24 | 23 | 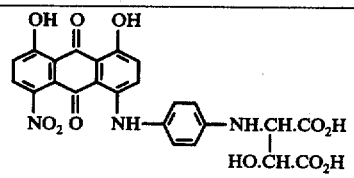 | B<br>D | Blue |
| 25 | 24 | 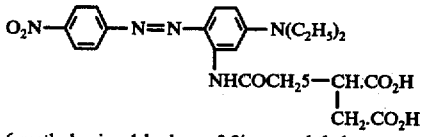 | A<br>C with ammonia | Red |
| 26 | 25 | 6-methylamino-1-hydroxy-2,2'-azonaphthalene-1',3,5'-trisulphonic acid acylated with cyanuric chloride and the product reacted with 4-aminophenylsuccinic acid | B | Orange |
| 27 | 26 | 7-methylamino-2(2-sulpho-4-methoxyphenylazo)-1-hydroxynaphthalene-3-sulphonic acid acylated with cyanuric chloride and the product reacted with 4-aminophenylsuccinic acid | B | Red |
| 28 | 27 | 2(4-amino-2-ureidophenylazo)naphthalene-3,6,8-trisulphonic acid acylated with cyanuric chloride and the product reacted with 4-aminophenylsuccinic acid | B | Golden yellow |
| 29 | 28 | 1-amino-4(3-amino-4-sulphoanilino)anthraquinone-2-sulphonic acid acylated with cyanuric chloride and the product reacted with 4-aminophthalic acid | B | Reddish blue |
| 30 | 29 | 2-amino-3,6,8-trisulphonaphthalene→2-methoxy-3-toluidine→8-amino-3,6-disulpho-1-naphthol acylated with cyanuric chloride and the product reacted with 4-aminophenylsuccinic acid | B | Blue |
| 31 | 30 | 2-sulphoaniline→8-amino-3,6-disulpho-1-naphthol acylated with cyanuric chloride and the product reacted with 4-aminophthalic acid | B | Bluish-red |
| 32 | 31 | As for Example 30 but the intermediate acylated with the half methyl ester of 3-aminophthalic acid | B | Bluish- |
| 33 | 32 | As for Example 30 but acylated with 3-aminophthalic acid | B | Bluish-red |
| 34 | 33 | As for Example 30 but acylated with 4-amino-homophthalic acid | B | Bluish-red |
| 35 | 34 | 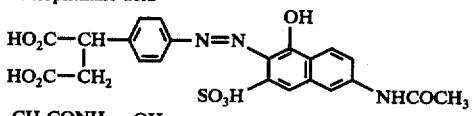 | B<br>D | Reddish-orange |
| 36 | 35 | 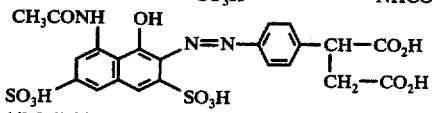 | D | Bluish-red |
| 37 | 36 | 1(2,5-dichloro-4-sulphophenyl)-3-methyl-4-(5-amino-3-sulphophenylazo)-5-pyrazolone acylated with cyanuric chloride and the product reacted with 4-aminophthalic acid | D | Greenish-yellow |
| 38 | 37 | N-ethyl-3-carbonamido-4-methyl-5(2,4-disulpho-5-aminophenylazo)6-hydroxy-pyrid-2-one acylated with cyanuric chloride and the product reacted with 4-aminophenylsuccinic acid | D | Greenish-yellow |
| 39 | 38 | 1-(4-sulphophenyl)-3-carboxy-4-(2-sulpho-5-amino-phenylazo)-5-pyrazolone acylated withcyanuric chloride and the product reacted with 4-aminophthalic acid | D | Greenish-yellow |
| 40 | 39 | 4-amino-2,2'-disulpho-4'-nitrostilbene N-ethylaniline acylated with cyanuric chloride and the product acylated with 4-aminophenyl-succinic acid | D | Yellow |
| 41 | 40 | 2-amino-4,8-disulphonaphthalene→3-toluidine acylated with cyanuric chloride and the product acylated with 4-aminophthalic acid | D | Yellow |
| 42 | 41 | 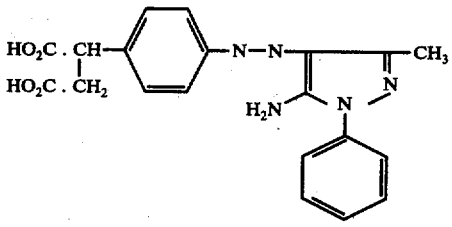 | A<br>C with methylamine | Greenish-yellow |

-continued

| Example | Dyestuff No. | DYESTUFF | Application Method | Shade on Nylon |
|---|---|---|---|---|
| 43 | 42 | 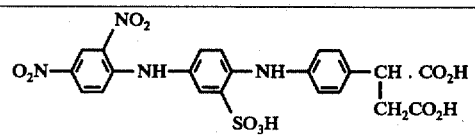 | D | Yellow-brown |
| 44 | 43 | 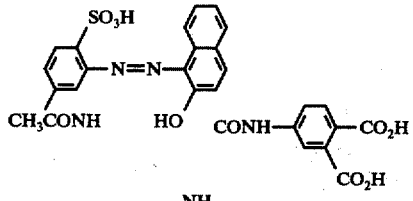 | B D | Scarlet |
| 45 | 44 | 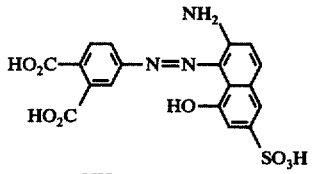 | B C with cyclohexylamine | Red |
| 46 | 45 | 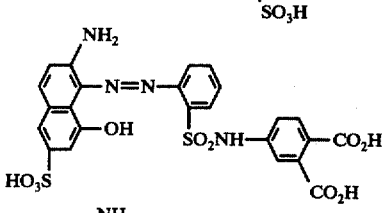 | D | Bluish-red |
| 47 | 46 | 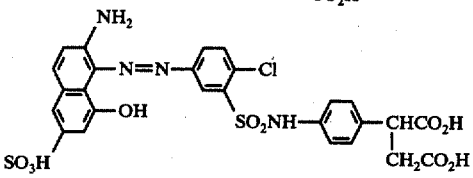 | B | Red |
| 48 | 47 | 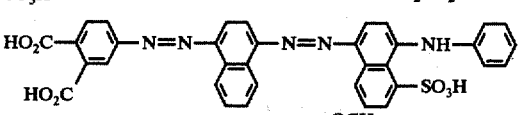 | B | Navy |
| 49 | 48 | 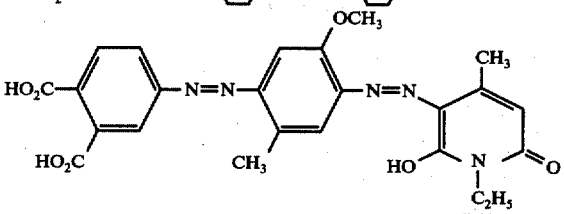 | D | Scarlet |
| 50 | 49 | 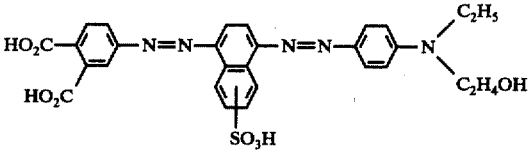 | D | Rubine |

The dyestuffs used in the above Examples may be prepared as follows:

Dyestuff 1

A solution of the diazonium salt obtained by diazotizing 2.175 parts of the hydrochloride of 4-aminophthalic acid in 2N hydrochloric acid is added to a solution of 1.75 parts of 1-phenyl-3-methyl-5-pyrazolone in 10 parts of water and 30 parts of 2N sodium hydroxide at 0° C. When coupling is complete the dye is precipitated by acidification with hydrochloric acid, filtered off, washed with water and dried at 50° C, yield 3.5g.

Dyestuff 2

A solution of the diazonium salt prepared by the diazotization of 2.17 parts of the hydrochloride of 4-aminophthalic acid in 20 parts of 2N hydrochloric acid is added to a solution of 1.64 parts of N,N-diethylaniline in 25 parts of 2N hydrochloric acid at 0°-5° C. After ½ hour sodium acetate is added to completely precipitate the dyestuff which is filtered off and purified by dissolution in dilute sodium hydroxide followed by precipitation with dilute mineral acid. The 2.2 parts of N,N-diethyl-4)3,4-dicarboxyphenylazo)aniline gives an orange solution in acetone with λmax 430. The dicarboxylic acid is converted to the anhydride by heating for 1 hour under reflux in acetic anhydride and then evaporating the solution obtained to dryness in vacuo. The anhydride of N,N-diethyl-4(3,4-dicarboxyphenylazo)aniline so obtained gives a red solution in acetone with λmax 494.

1.6 Parts of the anhydride of N,N-diethyl-4(3,4-dicarboxyphenylazo)aniline is dissolved in 25 parts of methanol and the solution heated under reflux for 2 hours. The solution is then evaporated in vacuo to give N,N-diethyl-4(3-carboxy-4-carbomethoxyphenylazo)aniline which gives an orange solution in acetone with λmax 453.

Dyestuff 3

A solution of the diazonium salt prepared by the diazotization of 2.17 parts of the hydrochloride of 4-aminophthalic acid in 20 parts of 2N hydrochloric acid is added to a solution of 1.64 parts of N,N-diethylaniline in 25 parts of 2N hydrochloric acid at 0°–5° C. After ½ hour sodium acetate is added to completely precipitate the dyestuff which is filtered off and purified by dissolution in dilute sodium hydroxide followed by precipitation with dilute mineral acid. The 2.2 parts of N,N-diethyl-4(3,4-dicarboxyphenylazo)aniline gives an orange solution in acetone with λmax 430. The dicarboxylic acid is converted to the anhydride by heating for 1 hour under reflux in acetic anhydried and then evaporating the solution obtained to dryness in vacuo. The anhydride of N,N-diethyl-4(3,4-dicarboxyphenylazo)aniline so obtained gives a red solution in acetone with λmax 494.

Dyestuff 4

Dyestuff 1 is converted to the corresponding anhydride by heating in acetic anhydride and the anhydride dyestuff so obtained reacted with an excess of β-methoxyethanol to give Dyestuff 4.

Dyestuffs 5 and 6

The anhydride derived from Dyestuff 1 (see above) is reacted in pyridine with N-methylaniline and diethylamine to give Dyestuffs 5 and 6 respectively.

Dyestuff 7

The diazonium compound obtained by the diazotization of 6.6 parts of 4-aminophenylsuccinic acid in 5 parts of concentrated hydrochloric acid and 50 parts of water is added to a solution of 3.48 parts of 1-phenyl-3-methyl-5-pyrazolone in 20 parts of water and 40 parts of 2N sodium hydroxide at 0°–5° C while maintaining an alkaline reaction by the addition of more 2N sodium hydroxide solution. After 15 minutes the solution is acidified and the precipitated 1-phenyl-3-methyl-4(α,β-dicarboxyethylphenylazo)-5-pyrazolone filtered off, washed with water and dried. Yield 5.6 parts.

Dyestuffs 8,9,10,11 and 12

These dyestuffs are prepared by coupling the diazonium salt derived from 4-aminophthalic acid, or the half ester, half amide, half N-methylamine or half N,N-diethylamide of 4-aminophthalic acid with N-ethyl-3-carbonamido-4-methyl-5-hydroxypyrid-2-one.

Dyestuffs 13, 14, 15, 16, 19, 24, 34, 35, 41, 42, 43, 44, 45 and 46

These dyestuffs are prepared by coupling the appropriate diazonium salt with the appropriate coupling component.

Dyestuff 17

3-Aminophthalic acid is condensed with 6-bromo-3-methylanthrapyridone.

Dyestuff 18

1-Amino-2(4-chlorosulphonylphenoxy)-4-hydroxyanthraquinone is condensed with the half methylester of 4-aminophthalic acid in pyridine.

Dyestuffs 20, 21 and 22

1-Amino-2-bromo-4-hydroxyanthraquinone is condensed with 4-mercaptophthalic acid to give Dyestuff 20. Dyestuffs 22 and 22 are prepared in an analogous manner.

Dyestuff 23

4-Aminophenylsuccinic acid is condensed with 4,5-dinitrochrysazin.

Dyestuff 25

A neutral solution of 11.34 parts of 6-methylamino-1-hydroxy-2,2′-azonaphthalene-1′,3,5′-trisulphonic acid in 200 parts of water is added during 15 minutes at 0°–5°.C to a stirred suspension of 4.0 parts of cyanuric chloride in 25 parts of acetone and 120 parts of water whilst the pH of the mixture is held at 4.5–5.0 by the gradual addition of 2N sodium hydroxide solution. The mixture is stirred for a further 30 minutes at 0°–5° C pH 4.5–5.0, screened to remove traces of insoluble material and the filtrates.

Dyestuffs 25 to 33, 36 to 40

The routes to these monochlorotriazinyl dyestuffs is indicated in Table I.

Dyestuffs 47, 48 and 49

The diazonium salt derived from 4-aminophthalic acid is coupled onto 1-naphthylamine, 5-methyl-2-anisidine and x-sulpho-1-naphthylamine and the products diazotized and coupled onto 1-anilino-8-sulphonaphthalene, N-ethyl-4-methyl-5-hydroxyprid-2-one and N-ethyl-N-β-hydroxyethylaniline respectively.

We claim:

1. A process for dyeing nylon fibers by applying thereto a dyestuff of the anthraquinone series containing a dicarboxylic cyclic anhydride grouping or a dicarboxylic acid grouping such that cyclic anhydride formation can occur by loss of water therefrom, or a half-ester or half-amide of such a dicarboxylic acid grouping, any carboxylic acid group in the said dyestuff being present in free acid form or in the form of a salt with ammonia or a volatile amine, said dicarboxylic grouping not being on the anthraquinone nucleus and being either in ortho position on a benzene ring attached to said anthraquinone nucleus or in anhydride-forming position or positioned with one carboxyl group on a carbocyclic aromatic ring attached to said anthraquinone nucleus and the other in anhydride-forming position therewith on an alkyl side chain, and heating the nylon fiber until fixation of the dyestuff takes place.

2. Process according to claim 1 wherein the said dyestuff contains a grouping $$<^{COOH}_{CONR_1R_1}$$

or $$<^{\overset{-}{COO}\overset{+}{A}H}_{CONHR_1R_1}$$

wherein $R_1$ is hydrogen or an alkyl or substituted alkyl group of 1 to 5 carbon atoms or an aryl group, $R_2$ is hydrogen or an alkyl or substituted alkyl group of 1 to 5 carbon atoms and A represents a molecule of ammonia or a volatile amine.

3. Process according to claim 1 wherein the dyestuff contains at least one sulphonic acid group or salt thereof.

4. Process according to claim 3 wherein the dyestuff additionally contains another type of fibre-reactive grouping.

5. Process according to claim 4 wherein the said fibre-reactive grouping is a halogenotriazinyl grouping.

6. Process according to claim 1 wherein the dyestuff in the form of a water soluble salt is applied to nylon fibre and free acid dyestuff is thereafter liberated by means of mineral or organic acid or a substance with generates an acid on heating.

7. Process according to claim 1 wherein the dyestuff is applied to nylon fibre from an aqueous or non-aqueous liquor or by a printing technique and subsequently baked or steamed at a temperature above 125° C.

8. Process according to claim 7 wherein the dyestuff is in the form of a salt with ammonia or a volatile amine.

9. Process according to claim 7 wherein the temperature is 180° to 210° C.

[10. Process according to claim 1 wherein the dyestuff is of the azo series.]

[11. Process according to claim 1 wherein the dyestuff is of the anthraduinone series.]

12. The process of claim 2 wherein said volatile amine is an aliphatic or cycloaliphatic amine.

* * * * *